(12) United States Patent
Jahnen

(10) Patent No.: US 8,162,614 B2
(45) Date of Patent: Apr. 24, 2012

(54) WORKPIECE, AND ALSO A WELDING METHOD FOR THE MANUFACTURE OF A WORKPIECE

(75) Inventor: Werner Jahnen, Dinhard (CH)

(73) Assignee: Sulzer Markets and Technology AG, Winterthur (CH)

( * ) Notice: Subject to any disclaimer, the term of this patent is extended or adjusted under 35 U.S.C. 154(b) by 692 days.

(21) Appl. No.: 12/084,722

(22) PCT Filed: Sep. 14, 2006

(86) PCT No.: PCT/EP2006/066376
§ 371 (c)(1),
(2), (4) Date: Apr. 2, 2009

(87) PCT Pub. No.: WO2007/054391
PCT Pub. Date: May 18, 2007

(65) Prior Publication Data
US 2009/0252606 A1    Oct. 8, 2009

(30) Foreign Application Priority Data

Nov. 10, 2005 (EP) .................................... 05405627

(51) Int. Cl.
*B64C 11/04* (2006.01)
*F03B 3/12* (2006.01)
*F03B 1/00* (2006.01)
*F03B 11/02* (2006.01)
*F04D 29/34* (2006.01)
*F03D 5/00* (2006.01)
*B23K 26/00* (2006.01)

(52) U.S. Cl. ............. 416/213 R; 415/208.1; 219/121.64
(58) Field of Classification Search ............. 219/121.64; 415/208.1; 416/213 R
See application file for complete search history.

(56) References Cited

U.S. PATENT DOCUMENTS

| 2002/0127108 A1 * | 9/2002 | Crall et al. ................ 416/213 R |
| 2005/0139581 A1 * | 6/2005 | Hu ........................... 219/121.14 |

FOREIGN PATENT DOCUMENTS

| DE | 21 30 127 A1 | 12/1972 |
| DE | 28 30 037 A1 | 7/1979 |
| DE | 102 13 914 A1 | 10/2003 |
| DE | 103 43 760 A1 | 4/2005 |
| EP | 1 239 116 A | 9/2002 |

OTHER PUBLICATIONS

JPO machine translation of JP 05-126092 (1993).*

* cited by examiner

*Primary Examiner* — J. H. Hur
(74) *Attorney, Agent, or Firm* — Kilpatrick Townsend & Stockton LLP

(57) ABSTRACT

The invention relates to a workpiece (1), in particular a rotor disc, an impeller or guide wheel for a turbine, for a pump or for a compressor, including a base body (2) with a guide vane (3), wherein the guide vane (3) is welded in notch-free manner to the base body (2) and/or to a cover part (4). Furthermore, the invention relates to a welding method for the manufacture of a workpiece (1).

17 Claims, 3 Drawing Sheets

WORKPIECE, AND ALSO A WELDING METHOD FOR THE MANUFACTURE OF A WORKPIECE

CROSS-REFERENCE TO RELATED APPLICATIONS

This application is a National Stage of International Application No. PCT/EP2006/066376, filed Sep. 14, 2006, and which claims the benefit of European Patent Application No. 05405627.0, filed Nov. 10, 2005, the disclosures of both applications being incorporated herein by reference.

BACKGROUND OF THE INVENTION

The invention relates to a workpiece, in particular to a rotor disc, to an impeller or to a guide wheel for a turbine, a pump or a compressor, and also to a welding method for the manufacture of a workpiece.

It is known to manufacture rotating rotor discs, pump wheels, impellers and also fixed guide rings for pumps, compressors or turbines from solid material by chip-forming machining. In rotor discs and guide wheels of simple geometrical construction, which are moreover not exposed to very high loads in the operating state, the rotor discs can also be assembled from individual components or made in one piece. This particularly applies to rotor discs of simple construction, which are not exposed to very large mechanical loads because they are not themselves moved and thus no imbalance or centrifugal forces occur. However, relatively slow running rotor discs can also be constructed from individual components with relatively little effort, for example, with suitable fits being provided on the components, which are then permanently connected by welding. However, these welds essentially only serve to fix the position and are not suitable for the transmission of larger forces and loads.

In this connection, the fixing of cover discs or hub discs to the blades of impellers is particularly problematic. This problem will be discussed briefly in the following by way of example and with reference to radial and axial compressors; however, the problem can in principle also be relevant to other corresponding apparatuses.

The radial compressor, for example, like the radial pump, consists essentially of a rotating rotor disc, also known as an impeller or a bladed disc, which is mounted on an axle and which can not only be open but also provided with a cover. In this special case the rotor disc can also be arranged in a surrounding fixed guide wheel, or enclosed by a spiral-shaped collecting space. In this arrangement the guide wheel has the shape of a diffuser in which a part of the kinetic energy produced in the rotor is transformed into pressure energy. In this embodiment, the guide wheel essentially comprises an upper disc and a lower disc, also termed cover or base, between which the guide vanes can be located.

The axial compressor including a rotor and a stator includes, in known manner, a rotor designed as a rotor disc with a drive shaft and guide vanes, and the rotor discs can be designed with or without an outer ring, in other words with or without a cover. The stator is formed as an enclosing housing in which the fixed guide vanes are accommodated, and a stator does not have to be provided in each case, such as in the case of certain ventilators for example.

It should be made clear at this point that, within the context of this application, the term "guide vane" is to be understood to mean not only the well-established term for the blades of a rotor disc but also the blades of a guide wheel.

In this arrangement, the rotor discs are heavily loaded in the operating state, since they are in part exposed to considerable centrifugal forces with enormous rotational speeds of up to 15,000 U/min at a diameter of the rotor disc of 400 m for example. In this arrangement circumferential speeds at the outer diameter of up to 400 m/s and more are absolutely within reach.

For this reason it is known to manufacture the rotor discs from solid material, depending on the application, for example from high-strength stainless steels, from super-alloys or other suitable metals or metal alloys, and to machine the guide vanes by means of a chip-forming machining process, by milling for example. When the rotors, such as in the case of an impeller, have to be additionally equipped with a cover part in the form of a cover, it is often no longer possible to mill the rotor disc as a whole in one piece out of solid material for purely geometrical reasons, but rather a one-part base body, which sits on the drive shaft of the compressor, is machined with guide vanes so that a cover part has to be subsequently placed on the guide vanes and has to be connected to them reliably. Alternatively, in special cases, it can also be possible for a cover part with guide vanes to be machined in one piece from solid material and for the base body, which is coupled to the drive shaft, to be subsequently assembled with the cover part with guide vanes and connected to form a complete impeller.

The problematic part is thus the connection of the guide vanes to an associated cover part or to a base body. In this connection DE 102 61 262 A1 discloses a method using guide vanes with cover discs which are connected by means of edgeless seams or penetration seams by means of laser welding or thermionic welding by butt welding or by through-going weld seams.

The disadvantage of this and related methods known from the prior art is, among other things, that notches in the material can lead to cracking forces so that unacceptably large notch effects can occur which, under the influence of the enormous centrifugal forces in the operating state, can lead to damage to the rotor disc which can lead ultimately to the destruction of the rotor disc and thus of the associated machine, for example of the compressor, of the pump or of the turbine.

SUMMARY OF THE INVENTION

It is therefore an object of the present invention to make available a workpiece, in particular a rotor disc, an impeller or a guide wheel for a turbine, a pump or a compressor, in which a cover part and/or a base body is reliably welded with the associated guide vanes, so that a secure operation is guaranteed even under extreme operating conditions, such as very high rotational speed for example. A further object of the invention is to make available a welding method for the manufacture of workpieces of this kind.

The invention thus relates to a workpiece, in particular to a rotor disc, an impeller or a guide wheel for a turbine, for a pump or for a compressor, including a base body with a guide vane, wherein the guide vane is welded to the base body and/or to a cover piece in notch-free manner.

The elimination of inner notch effects takes place in this arrangement by means of an overall sealing of the guide vanes with the cover part and/or the base body by means of a plurality of overlapping weld runs. The elimination of outer notch effects in the angle between a foot and/or an apex of the guide vane and the cover part and/or the base body is achieved for example by means of preliminary milling of a transitional radius on the guide vane which is likewise welded with the cover part and/or the base body. The elimination of notch effects by means of surface roughness is assured by the laminar laser welding process as such since, on melting of the run-out of the pre-formed radius of the guide vane, this leaves behind a smooth melted surface at the side facing away from the beam guidance. Additionally, on exceeding the blade thickness, which can be through welded, which can be dependent on the laser beam power, the milling of grooves into the cover part and/or into the base body can be provided at a depth, which leaves behind a residual wall thickness at the groove base which can be welded through. By means of subsequent filling of the groove using a suitable method, in particular using a fusion welding method, the groove can be filled up again, or closed.

It is clear that the welding together can also take place by a combination of different welding methods. Thus, for example, the areal welding process can be electron beam welding, while the outer regions are welded with a laser beam, or vice versa.

It goes without saying that in special embodiments the guide vane can be provided either at the cover part or at the base body or also simultaneously at the base body and at the cover part.

It is further clear that the invention relates in particular to fast rotating rotor discs and that the welding methods in accordance with the invention have particularly advantageous applications for welding fast rotating workpieces such as fast rotating rotor discs. It goes without saying, however, that the invention also relates to fixed guide wheels, which have to be for example particularly resistant to strong thermal loads or to other mechanical loads, for example flow loads which can occur in the operating state, for example of a turbine, of a pump or of a compressor, which also do not relate to the loads caused by centrifugal forces.

Particularly advantageously, but not necessarily, a rotor disc in accordance with the invention is made of solid material according to the application, for example of high-strength stainless steel, of a super-alloy or of another suitable metal or metal alloy, and the guide vanes are machined out of this material by means of a chip-forming process, for example by milling. It is to be understood that the vane channels at the base body and/or at the cover part can also be manufactured by other suitable processes, for example by eroding, by forging, by welding, etc.

When the rotor discs, such as in the case of an impeller, have to be additionally equipped with a cover part in the shape of a cover, it is no longer possible, for purely geometric reasons, to mill the rotor disc as a whole in one piece out of solid material, but rather a one-piece base body, which can be mounted on the drive shaft of the compressor, is machined with guide vanes, so that a cover is subsequently placed on the guide vanes and welded with these reliably in accordance with a welding method in accordance with the invention. In special cases, it can also be possible for the cover part with guide vanes to be machined in one piece out of solid material and for the base body, which is coupled with the drive shaft, to be subsequently welded to the cover part with guide vanes according to a welding method in accordance with the invention to form a complete impeller. It is to be understood that the invention furthermore also relates to rotor discs and guide wheels without a cover part and that the method in accordance with the invention can also be used to advantage for the manufacture of such workpieces.

In a special embodiment, the invention relates to a workpiece with the guide vanes at the base body and/or at the cover part being welded with an energetic beam, in particular with a laser beam, especially by means of deep laser welding which is also well-known to the person averagely skilled in the art by the English term "key-hole welding". In this arrangement the guide vane is preferably completely, i.e. areally, welded over a total width of a contact surface between the base body and/or the cover part. By this means the undesirable notch effects are avoided which occur in the welded workpieces known from the prior art.

In particular, in order to also suppress notches or notch effects at the edge of the welded region, the guide vane is particularly advantageously designed in the region of the contact surface so that it extends diverging in the direction towards the contact surface, in particular in the shape of a milled-out circular arc.

Above all, in cases in which the base body and/or the cover part has a thickness which is so large that it cannot be welded through by the welding beam, in particularly by the laser beam, a welding groove can be provided on the side of the guide vane facing away from the contact surface, so that the thickness to be welded through is reduced.

The welding groove is preferably filled with a filler material; i.e. after completed welding the welding groove can be refilled with a filler material, for example by means of build-up welding.

As has already been mentioned above, in an embodiment which is particularly important for practical use, the guide vanes can be machined out of the base body and/or the cover part by means of a chip-forming machining process, for example by means of milling.

In this arrangement nickel-based alloys, among other things, especially Inconel, particularly Inconel 718, a super-alloy, steel, titanium aluminum or other suitable metals or metal alloys come into question as preferred materials for the base body and/or the guide vanes and/or the cover part.

The invention further relates to a welding method for the manufacture of a workpiece, in particular of a rotor disc, of an impeller, or of a guide wheel for a turbine, a pump or a compressor, including a base body with a guide vane, wherein the guide vane is welded notch-free to the base body and/or to a cover part.

In this arrangement the cover part is preferably welded to the base body and/or to the cover part by an energetic beam, in particular by a laser beam, especially by means of laser deep welding, wherein the guide vane is particularly advantageously welded completely i.e. areally welded over a total width of a contact surface between the base body and/or the cover part. In this arrangement the guide vane can extend in the region of the contact surface diverging in the direction towards the contact surface and the guide vane is also welded in notch-free manner in the region of a boundary line of the contact surface.

Especially in the case of a base body and/or of a cover part of large thickness, a welding groove can be provided in the base body and/or in the cover part on a side of the guide vane facing away from the contact surface and the welding groove can be filled up with a filler material, in particular by means of build-up welding, after the actual welding process.

In an embodiment which is particularly important for practical use the guide vane is machined out of the base body and/or out of the cover part by means of a chip-forming machining process, in particular by milling. In this arrangement the base body and/or the guide vane and/or the cover part is advantageously made of a nickel-based alloy, especially of Inconel, particularly of Inconel 718, of a super-alloy, of steel, of titanium aluminum or of another suitable metal or of a metal alloy.

BRIEF DESCRIPTION OF THE DRAWINGS

The invention will be explained in more detail in the following with reference to the drawings.

DESCRIPTION OF THE PREFERRED EMBODIMENTS

Figure 1:
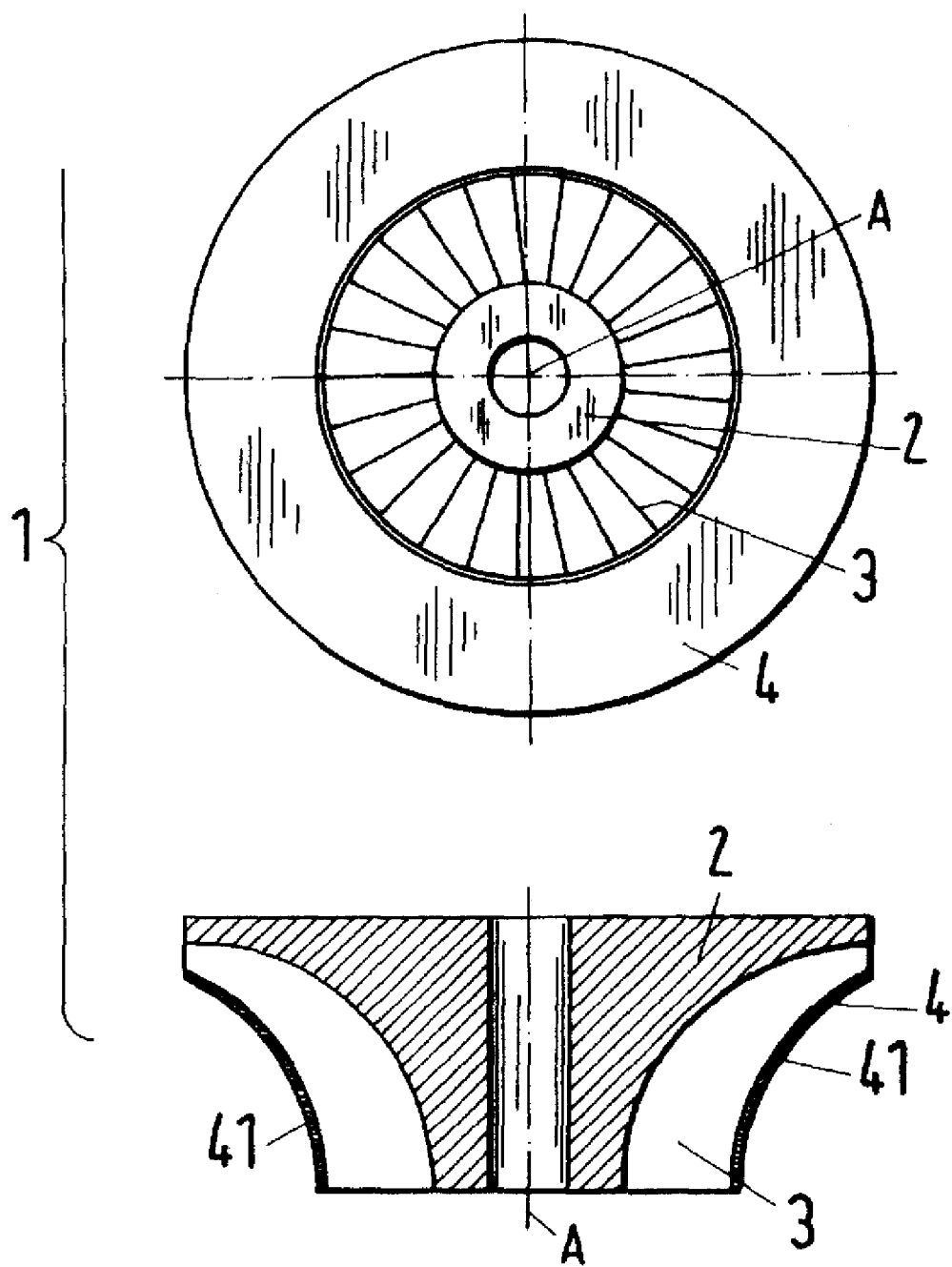
FIG. 1 shows an impeller of a radial compressor in section.

FIG. 1 shows a schematic illustration of an impeller, for example of a radial compressor, in section and in the corresponding plan view, the basic geometry of which is well known per se. The impeller in accordance with the invention, which is designated with the reference numeral 1 in the following, includes in a manner known per se a base body 2, which is rotatably arranged about an axis 2 on a drive shaft, for example in a compressor. A plurality of guide vanes 3 are machined out of the base body 2 by means of a chip-forming process, for example by turning or milling. In a substantially radial direction towards the outside, the impeller is covered by a cover part 4 which extends along an axial direction diverging towards the outside and which is welded to the guide vanes 3 by means of a welding method in accordance with the invention. The welding seam 41, at which the cover part 4 is welded to the guide vanes 3 securely and notch-free, can be clearly recognized in FIG. 1.

Figure 2:
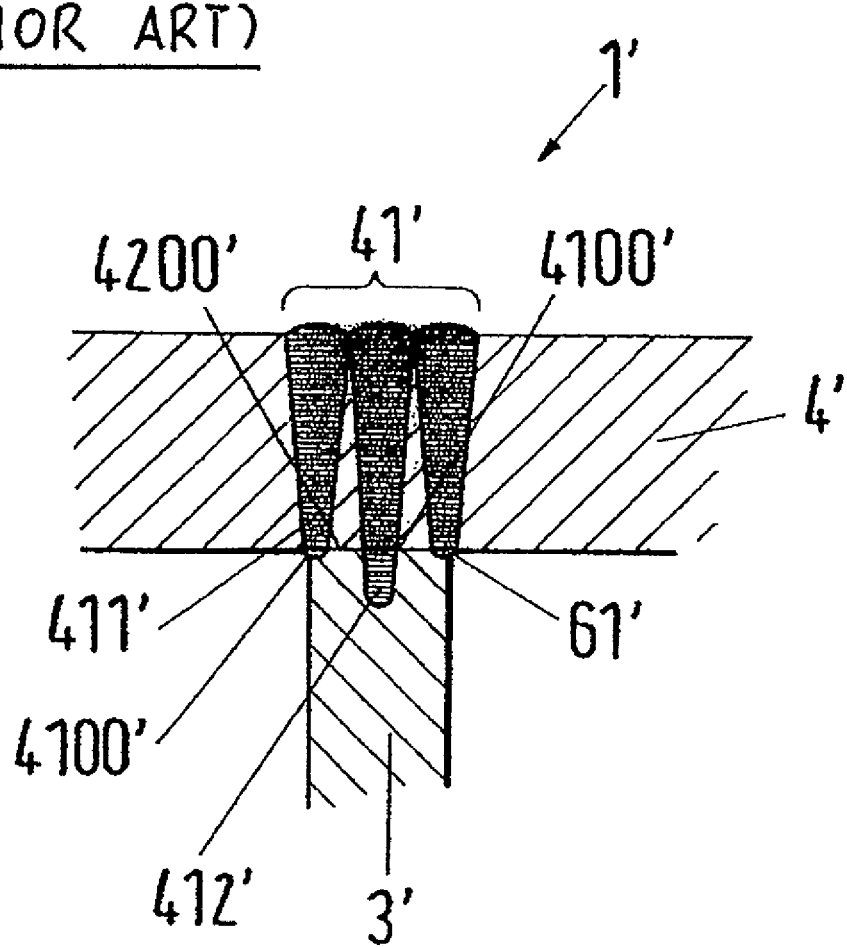
FIG. 2 shows a rotor disc with cover part, welded using a method known from the prior art.

In order to demonstrate the problems with the welding methods known from the prior art once more, a rotary disc 1' with cover part 4' is illustrated in part and in section in FIG. 2, which geometrically substantially corresponds to the impeller 1 according to FIG. 1 in accordance with the invention, the rotary disc 1' however not being welded by means of a welding method in accordance with the invention, but in accordance with a known method, such as was proposed in DE 102 61 262 A1 for example.

In order to delimit the invention over the prior art the reference numerals for features of a known rotary disc 1' are provided with an inverted comma, while the reference numerals which indicate the features of a workpiece 1 in accordance with the invention are not provided with an inverted comma.

The cover part 4' of the rotary disc 1' of FIG. 2 was, as can be clearly recognized, welded to the guide vane 3' by means of a deep welding method, in the present case by means of deep laser welding. A method of this kind is in principle always applicable when the thickness of the material to be welded, in the present case the thickness of the cover part 4', is dimensioned in such a way that the energetic beam, in the present case the laser beam, can penetrate the cover part 4' preferably up to and into the body 3' to be welded on, in other words here up to and into the guide vanes 3' during the welding process. In the example of FIG. 2 the guide vane 3' was welded to the cover part 4' via three more or less separate deep welding points 411', 412'. By this means notches 4100', 4200' arise at the connection points between cover part 4' and the guide vane 3', which, as has been shown, lead to too high notch stresses and thus to high notch concentration factors, which has a massive negative influence on the stability and solidity of the weld, in particular under extreme operating conditions, such as for example at high rotational speeds of the guide wheel 1'. In the worst case, it can result in this arrangement in cracks in the region of the weld and under the impact of the very high centrifugal forces during fast rotation of the rotor disc 1' to its destruction with all known consequences.

In this arrangement the notches do not arise because two or more, deep welding points 411', 412' have been introduced, which are more or less separated from each other. It has furthermore namely been shown that the geometric design of the guide vanes in the region of the weld itself already leads to a very damaging notch effect. Since the guide vanes known from the prior art in an extreme case abut more or less sharp-edged on the cover part 4' at an angle of approximately 90°, such as is shown in the example of FIG. 2, notches automatically arise during welding, which have a massive negative influence on the strength and quality of the welded connection during welding at the boundary line 61' which defines the radial boundary of the guide vanes 3' in the region in which guide vane 3' adjoins the cover part 4'.

This means it is an essential recognition of the present invention that not only welding across more or less separated deep welding points 411', 412', but also the geometry of the guide vanes in the region of the welding connection, can lead to undesired notch effects, which negatively influence the strength of the welded connection.

Figure 3:
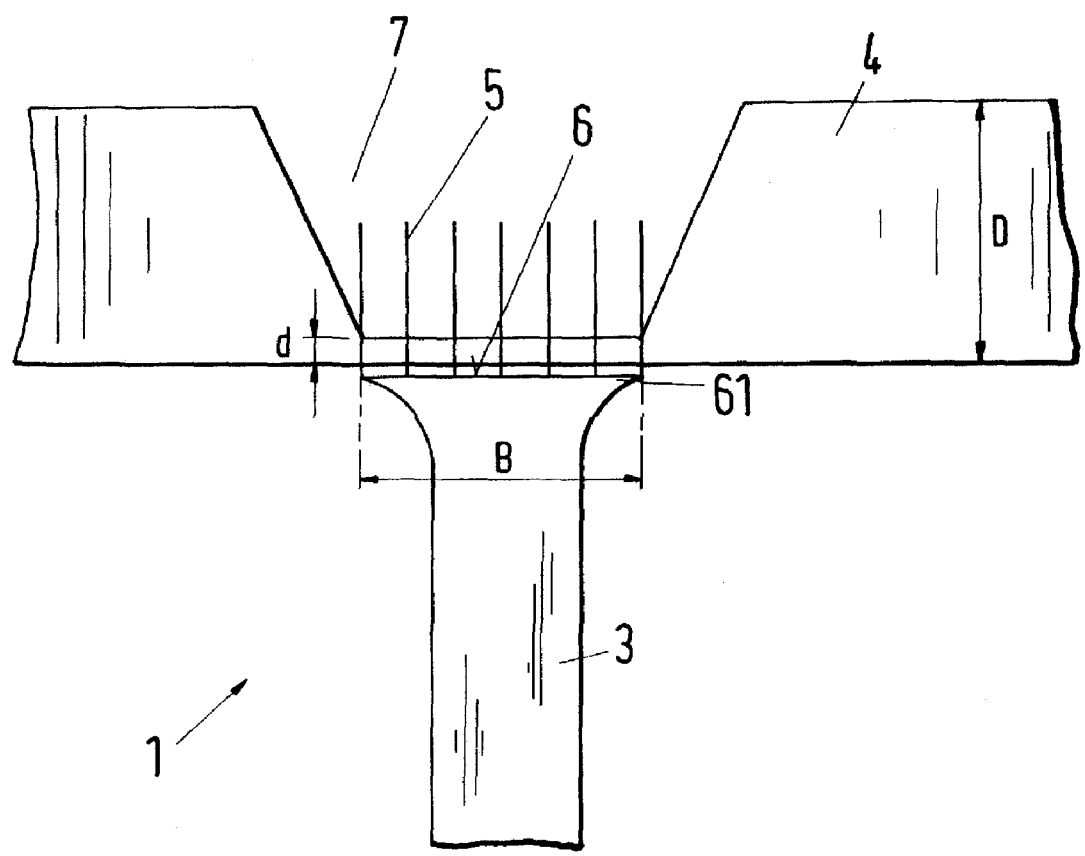
FIG. 3 shows a rotor disc in accordance with FIG. 1, welded using a welding method in accordance with the invention.

Finally, a rotary disc in accordance with FIG. 1 is schematically illustrated in FIG. 3 which was welded using a welding method in accordance with the invention. In the embodiment illustrated in FIG. 3, of an impeller 1 in accordance with the invention, this is an impeller 1, which has a cover part 4 which has a thickness D, such that the energetic beam 5, in the present example the laser beam 5, is not able to penetrate the complete thickness D of the cover part 4. A cover part 4 of such a large thickness D can be necessary, for example, when very large forces act on the cover part 4 in the operating state, so that a particularly high stability of the cover part 4 is guaranteed.

A welding groove 7 is provided in the cover part 4 on a side of the guide vane 3 facing away from the contact surface 6 so that, in spite of the large thickness D of the cover part 4, the guide vane 3 can be welded to the cover part 4 by means of laser deep welding, which is known per se. By this means the laser beam 5 only has to penetrate the reduced thickness d at the cover part 4 during deep laser welding.

In order to avoid the damaging notch effect or the damaging notches described in detail above, in particular with reference to FIG. 3, the impeller in accordance with the invention is welded evenly and completely across a total width B of the contact surface 6 between the base body 2 and the cover part 4. I.e. more or less separate deep welding points 411', 412' are not introduced, as known from the prior art, but rather the impeller is welded evenly and completely two-dimensionally across the total width B of the contact surface 6 between the base body 2 and the cover part 4, so that the feared notches, which among other things arise due to localized deep welding, can be avoided by the areal welding in accordance with the present invention.

In this arrangement not only are notches effectively avoided in the region within the boundary line 61, i.e. in the region of the contact surface 6, but rather notches or notch effects at the edge 61 of the weld, in other words in the region of the boundary line 61, are effectively avoided by means of the special geometrical design of the guide vane 3. This is achieved by the fact that the guide vane 3 extends in the region towards the contact surface 6, diverging in the direction towards the contact surface 6, preferably in the form of a circular arc for example, i.e. at a predetermined constant or not constant radius, and thus the guide vane 3 does not abut at the cover part 4 in a more or less sharp-edged joint. Through the diverging geometry of the guide vane 3 in the region of the contact surface 6, a gentle transition is created between the guide vane 3 and cover part 4 in the region of the boundary line 61, so that notches or notch effects are also avoided in the boundary regions of the weld.

It is to be understood that in certain cases, in particular when no extreme strength values are required, the divergence does not have to be in the form of a radius but can also be in the form of an inclined platform.

The function of the diverging guide vane is, namely, in addition to the avoiding of notches, also the enlarging of the connection surface, so that greater forces can be transmitted.

The invention claimed is:

1. A workpiece, in particular a rotor disc, impeller or guide wheel for a turbine, for a pump or for a compressor, comprising a base body with a guide vane, the guide vane being welded to the base body and/or to a cover part in notch-free manner, wherein the guide vane is completely welded over a total width of a contact surface between the base body and/or the cover part, and wherein the guide vane extends diverging in the direction towards the contact surface in the region of the contact surface.

2. A workpiece, in particular a rotor disc, impeller or guide wheel for a turbine, for a pump or for a compressor, comprising a base body with a guide vane, the guide vane being welded to the base body and/or to a cover part in notch-free manner, and wherein the guide vane extends diverging in the direction towards the contact surface in the region of the contact surface.

3. A workpiece in accordance with claim 2, wherein the guide vane is welded to the base body and/or to the cover part by an energetic beam.

4. A workpiece according to claim 3 wherein the energetic beam comprises a laser beam.

5. A workpiece in accordance with claim 2, wherein the guide vane is completely welded over a total width of a contact surface between the base body and/or the cover part.

6. A workpiece in accordance with claim 2, wherein a welding pool trough is provided in the base body and/or in the cover part on a side of the guide vane facing away from the contact surface.

7. A workpiece in accordance with claim 6 wherein the welding pool trough is filled with a filler material.

8. A workpiece in accordance with claim 2, wherein the guide vane is machined from the base body and/or from the cover part by means of a chip-forming machining process, by eroding, by forging and/or by welding.

9. A workpiece in accordance with claim 2, wherein the base body and/or the guide vane and/or the cover part is a nickel-based alloy, especially Inconel, in particular Inconel 718, a superalloy, of steel, of titanium aluminum or of another suitable metal or a metal alloy.

10. A welding method for the manufacture of a workpiece, in particular of a rotor disc, of an impeller or of a guide wheel for a turbine, a pump or a compressor, including a base body with a guide vane, comprising welding the guide vane in notch-free manner to the base body and/or to a cover part, diverging the guide vane in the region of the contact surface in the direction towards the contact surface, and welding the guide vane in notch-free manner in the region of a boundary line of the contact surface.

11. A welding method in accordance with claim 10, wherein the guide vane is welded to the base body and/or to the cover part by an energetic beam.

12. A welding method according to claim 11 wherein welding by an energetic beam comprises welding with a laser beam.

13. A welding method in accordance with claim 10, wherein the guide vane is completely welded over a total width of a contact surface between the base body and/or the cover part.

14. A welding method in accordance with claim 10, wherein a welding pool trough is provided in the base body and/or in the cover part at a side of the guide vane facing away from the contact surface.

15. A welding method in accordance with claim 14, wherein the welding pool trough is filled with a filler material, in particular by means of build-up welding.

16. A welding method in accordance with claim 10, wherein the guide vane is machined from the base body and/or from the cover part by means of a chip-forming machining process, by eroding, by forging or by welding.

17. A welding method in accordance with claim 10, wherein the base body and/or the guide vane and/or the cover part is made from an nickel-based alloy, especially of Inconel, in particular of Inconel 718, of a superalloy, of steel, of titanium aluminum or of another metal or of a metal alloy.

* * * * *